H. H. BROWN.
SPEED INDICATOR FOR PHONOGRAPHS.
APPLICATION FILED OCT. 18, 1916. RENEWED JUNE 18, 1918.
1,293,018.
Patented Feb. 4, 1919.
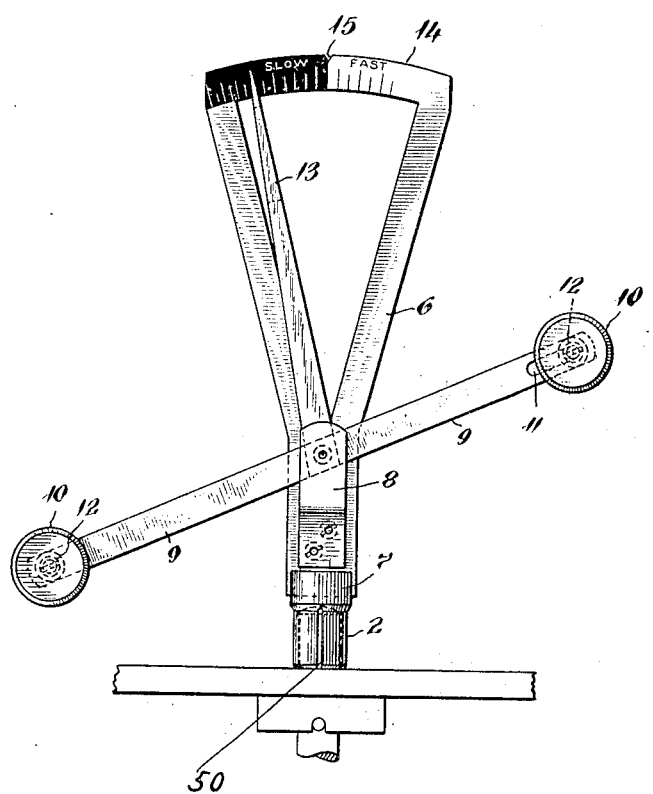
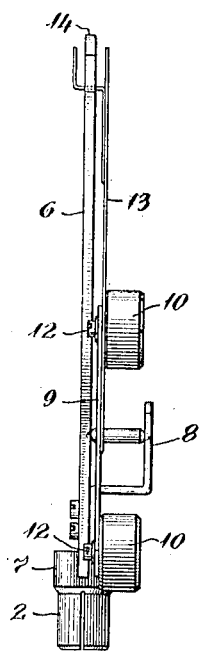
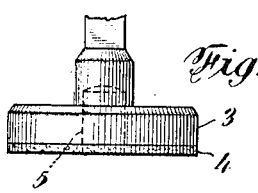
Inventor
Horace H Brown
By his Attorney

UNITED STATES PATENT OFFICE.

HORACE HENRY BROWN, OF NEW YORK, N. Y.

SPEED-INDICATOR FOR PHONOGRAPHS.

1,293,018.

Specification of Letters Patent.

Patented Feb. 4, 1919.

Application filed October 18, 1916, Serial No. 126,397. Renewed June 18, 1918. Serial No. 240,684.

*To all whom it may concern:*

Be it known that I, HORACE H. BROWN, a citizen of the United States, residing at New York, in the county of New York and State of New York, have invented certain new and useful Improvements in Speed-Indicators for Phonographs, of which the following is a specification.

This invention relates to phonographs and similar instruments having a rotating disk, and it more particularly relates to speed indicators for use with phonographs, the object of the invention being to provide an improved speed indicator, simple in construction, inexpensive to manufacture, durable in use, effective in operation, and which can be readily removed or replaced for use by the user, and by means of which the speed of the rotating disk can be quickly ascertained.

In the drawings accompanying and forming part of this specification Figure 1 is a front view of this improved phonograph speed indicator; Fig. 2 is a side view thereof; Fig. 3 is a detail view of a different form of supporting means for the speed indicator.

Similar characters of reference indicate corresponding parts in the several figures of the drawings.

On some phonographs a speed dial is provided numbered from 0 to 100 to indicate the number of revolutions per minute of the record. Seventy-eight (78) or eighty (80) revolutions per minute is the proper speed for most records to revolve. With the use of this kind of speed dial it is the practice to put a piece of paper under the record on the turntable and time it for a minute to see that the turntable runs at 78 or 80 revolutions per minute, the speed being adjusted by a rod coming from the motor. It is very difficult to get exact results in this manner, as often the party at the turntable miscounts, and hence it is not very satisfactory, not only because it requires mental effort on the part of the user, but because it takes time to make sure that the proper results are obtained.

The present improvement obviates the necessity of any mental effort so far as counting the number of revolutions of the disk, etc., and reduces the amount of time necessary to determine whether or not the record is revolving at the proper speed, while, at the same time when not in use the indicator can readily be removed and replaced when required.

The present improvement in the preferred form thereof herein shown and described comprises suitable supporting means which may be in the form of a spring or split bushing 2, adapted to fit over the projecting end of the turntable spindle, 50 or it may consist of a suitable weighted base 3, having a layer of felt 4 on its under side, and an opening 5, (see Fig. 3) for the reception of the end of the turntable spindle. To either form of this supporting means is secured a sector plate 6 in any suitable manner. In the form shown in Figs. 1 and 2, this sector plate is secured to its supporting means or base by having its lower end projecting into a slotted head 7 of the supporting means, and to which it may be soldered. Carried by the lower end of the sector is an angle-formed bracket 8, between which and the sector is pivotally supported a bar 9, carrying at each end thereof a weight 10, the weight at one end being adjustable relatively to the bar by means of an elongated slot 11 and a suitable screw 12. By this means the instrument may be properly calibrated. The weights are set slightly out of balance, this being accomplished in one way by making one arm of the bar slightly longer than the other, so that when the instrument is at rest the weighted end of the longer portion of the bar will be in its lowermost position, so that the pointer will return to zero when the machine is stopped.

Secured to the bar at the pivotal point thereof or to the pivot of such bar is an upstanding pointer 13, which is in the present instance shown having a duplex end, that is to say, the upper end of the pointer is so made that one part thereof projects at one side of the sector, while the other part thereof projects at the opposite side of the sector, so that the instrument can be easily read on either side thereof when in use.

The cross-beam or bar 14 of the sector has one-half thereof colored, as for instance, the left side colored or blackened to clearly distinguish it from the opposite half, the dividing line between the different colored portions midway of the cross bar indicating the point where the pointer should be when the instrument is running, say at 78 or 80 revolutions per minute and this dividing line may also be indicated by a notch 15 located midway of the sector bar. The left side of this bar may be marked slow and the right side fast.

When the record is properly running centrifugal force causes the pointer to move in accordance with the speed of the turntable spindle, and if this speed is the proper one the pointer will be at the notch hereinbefore referred to. If, however, the speed is too slow or too fast the pointer will so indicate.

In calibrating the instrument it is placed upon a machine in which the spindle has a known speed of, say 78 revolutions per minute, and the adjustable weight is moved until the pointer coincides with the notch on the cross-bar. When the user desires to ascertain if any particular record is rotating at the right speed it is merely necessary to set the instrument on the projecting end of the disk spindle and watch the pointer to see to what point it is shifted as the disk spindle rotates, so that without counting or other mental calculation it can be readily ascertained whether the spindle and the disk are rotating at the proper speed.

I claim as my invention:

1. A speed indicator for phonographs comprising indicating means, a pair of counterbalancing means therefor, one having a different balancing effect than the other, and means for supporting said parts and adapted to be attached to the rotary part of a phonograph.

2. A speed indicator for phonographs comprising indicating means, a pair of counterbalancing means therefor, one located to have a different balancing effect than the other, and means for supporting said parts and adapted to be attached to the rotary part of a phonograph.

3. A speed indicator for phonographs comprising indicating means including a movable member, a pair of counterbalancing means therefor, one located at each side of the movable member and one farther from said movable member than the other, and means for supporting said parts and adapted to be attached to the rotary part of a phonograph.

4. A speed indicator for phonographs, comprising a detachable, centrifugally operated device comprising a sector, and a pointer and a pair of weights pivotally supported relatively to the sector, one of said weights being adjustable relatively to the other, and one of said weights being located farther away from the pointer than the other.

5. A speed indicator for phonographs comprising indicating means including a movable member, a pair of counterbalancing means therefor, one located at each side of the movable member and one farther from said movable member than the other and one adjustable relatively to the other, and means for supporting said parts and adapted to be attached to the rotary part of a phonograph.

6. A speed indicator for phonographs comprising indicating means including a movable member, a pair of counterbalancing means therefor, one located at each side of the movable member and one farther from said movable member than the other, and means for supporting said parts and constructed for attachment to a phonograph disk spindle.

7. A detachable speed indicator for phonographs comprising indicating means, including a movable member, a pair of counterbalancing means therefor, one located at each side of the movable member and one farther from said movable member than the other, and means for supporting said parts and constructed for detachable attachment to a phonograph disk spindle.

8. A detachable speed indicator for phonographs comprising indicating means including a movable member, a pair of counterbalancing means therefor, one located at each side of the movable member and one farther from said movable member than the other and one adjustable relatively to the other, and means for supporting said parts and constructed for detachable attachment to a phonograph disk spindle.

9. A speed indicator for phonographs comprising a part adapted to fit the projecting end of a phonograph disk spindle, a cross-bar pivoted thereto, a pointer carried by the cross-bar, a pair of weights secured to the cross-bar and having a different balancing effect.

10. A speed indicator for phonographs comprising a part adapted to fit the projecting end of a phonograph disk spindle, a cross-bar pivoted thereto, a pointer carried by the cross-bar, a pair of weights secured to the cross-bar and having a different balancing effect, and one adjustable relatively to the other.

11. A speed indicator for phonographs comprising supporting means adapted to fit the projecting end of a phonograph disk spindle, a pivoted pointer, a pair of counterbalanced weights connected thereto, one adjustable relatively to the other, and means for indicating the position of the pointer, said means comprising a sector having its cross-bar formed to indicate different positions of the pointer.

12. A speed indicator for phonographs comprising supporting means adapted to fit the projecting end of a phonograph disk spindle, a sector secured thereto, a pointer pivotally secured to said sector and having a duplex end, and a pair of counterbalanced weights secured to said pointer, one at a greater distance from the pointer than the other.

13. A speed indicator for phonographs, comprising supporting means adapted to fit the projecting end of a phonograph disk spindle, a sector secured thereto, a pointer pivotally secured to said sector and having a duplex end, and a pair of counterbalanced weights secured to said pointer, one at a greater distance from the pointer than the other, one of said weights being adjustable relatively to the other.

14. A speed indicator for phonographs, comprising a split sleeve adapted to fit over the projecting end of a phonograph disk spindle, a cross bar secured to said sleeve, a pivotally supported bar, a weight at each end thereof, one located farther away from the pivot than the other, and a pointer secured to said last bar.

15. A speed indicator for phonographs, comprising a split sleeve adapted to fit over the projecting end of a phonograph disk spindle, a cross bar secured to said sleeve, a pivotally supported bar, a weight at each end thereof, one located farther away from the pivot than the other, and a pointer secured to said last bar, one of said weights adjustable on the bar relatively to the other weight.

16. A speed indicator for phonographs comprising a part adapted to fit the projecting end of a phonograph spindle, a cross-bar pivoted thereto for swinging movement, an upright pointer carried by the cross-bar for swinging movement with the bar, and a pair of weights secured to the cross-bar one on each side of the pointer.

17. A speed indicator for phonographs comprising a part adapted to fit the projecting end of a phonograph spindle, a cross-bar pivoted thereto, a pointer carried by the cross-bar, a pair of weights secured to the cross-bar, and an upright sector rigidly secured to said spindle-fitting part.

18. A speed indicator for phonographs comprising a part adapted to fit the projecting end of a phonograph spindle, a cross-bar pivoted thereto, a pointer carried by the cross-bar, a pair of weights secured to the cross-bar, and an upright sector rigidly secured to said spindle-fitting part, one of said weights being located farther away from the cross-bar pivot than the other and one adjustable relatively to the other.

Signed at New York, in the county of New York and State of New York, this 12 day of October, 1916.

HORACE HENRY BROWN.

Witnesses:
DAVID CAMBACH,
THOMAS S. CORBETT.

Copies of this patent may be obtained for five cents each, by addressing the "Commissioner of Patents, Washington, D. C."